United States Patent [19]
Glenn et al.

[11] Patent Number: 5,726,541
[45] Date of Patent: Mar. 10, 1998

[54] FAILURE DETECTION AND COMMUNICATION SYSTEM FOR ELECTRICALLY DRIVEN VEHICLES

[75] Inventors: Christopher John Glenn; Henry Piers Seed, both of Christchurch, New Zealand

[73] Assignee: Dynamic Controls Limited, Christchurch, New Zealand

[21] Appl. No.: 325,392

[22] PCT Filed: Apr. 28, 1993

[86] PCT No.: PCT/NZ93/00029

§ 371 Date: Mar. 17, 1995

§ 102(e) Date: Mar. 17, 1995

[87] PCT Pub. No.: WO93/22151

PCT Pub. Date: Nov. 11, 1993

[30] Foreign Application Priority Data

Apr. 28, 1992 [NZ] New Zealand ............................ 242525
Jan. 18, 1993 [NZ] New Zealand ............................ 245695

[51] Int. Cl.[6] .................................................. H02P 3/00
[52] U.S. Cl. ............................ 318/16; 361/23; 318/479
[58] Field of Search .................................. 180/275, 277, 180/279; 318/16, 581, 587; 361/23, 28, 31, 33, 78, 86, 88, 91, 362–376, 479

[56] References Cited

U.S. PATENT DOCUMENTS

| | | | |
|---|---|---|---|
| 3,641,488 | 2/1972 | Mullin | 340/52 F |
| 4,130,787 | 12/1978 | Allaire et al. | 318/612 X |
| 4,136,329 | 1/1979 | Trobert | 180/103 |
| 4,934,477 | 6/1990 | Dai | 180/277 X |
| 5,117,218 | 5/1992 | Sasaki et al. | 180/279 X |
| 5,163,001 | 11/1992 | Luke Jr. | 318/587 X |
| 5,384,522 | 1/1995 | Toriyama et al. | 318/376 X |

*Primary Examiner*—Jonathan Wysocki
*Attorney, Agent, or Firm*—Gary M. Nath; Harold L. Novick; Nath & Associates

[57] ABSTRACT

To effect failure detection and communication between the modules in a modular control system for an electrically driven vehicle in which modules are interconnected by a serial data bus, one line of the serial bus may be biased high or low by modules of the system when a fault is detected. This is detected by a kill system of the modules to which disable safety related functions of each module are applicable. Modules other than the remote control module can include wake up circuitry which supplies power to the modules at start up, or deactivated modules, when the data line is biased high. The modules preferably operate as finite state machines with each module storing in its memory network variables required for the operation of that module. The network variables include the state of other modules, external demand signals, and measured variables of the system.

20 Claims, 11 Drawing Sheets

FAILURE DETECTION AND COMMUNICATION SYSTEM FOR ELECTRICALLY DRIVEN VEHICLES

TECHNICAL FIELD

This invention relates to controllers for electrically driven vehicles, particularly wheelchairs, scooters and the like. Particularly, although not exclusively, the invention relates to a modular control system in which the modules are connected by a digital serial bus.

BACKGROUND TO THE INVENTION

To the present time wheelchair controllers have typically consisted of a single unit containing all control circuitry which receives control commands from a joy stick. Should the controller fail then the whole unit must be replaced. Further, the addition of additional modules or features typically required physical modification of the controller.

European patent EP 0345785 discloses a wheelchair controller comprising a command module and a control unit linked by a serial connection. Both the command module and control module include processing units. A key PROM contains a code to enable an operator to use the chair as well as user defined parameters setting the operational characteristics of the chair. This specification does not however contemplate an expandible modular system. The serial connection is merely a means of linking the command module to the control module and does not suggest the use of a serial bus interconnecting a number of modules. The programmable features provided are merely to allow user requirements to be set, not to enable configuration for different hardware configurations.

Safety features are of concern to wheelchair manufacturers as faulty operation of a controller can result in personal injury. Prior art wheelchair controllers have offered limited safeguards. Typically all that is provided is a switch allowing the power supply or the motors to be disconnected from the controller. This may result in undesirably rapid stopping of the wheelchair or in a wheelchair malfunctioning from a fault which could have been detected. A particular concern with wheelchair controllers is that should a malfunction occur the driving and actuating modules should assume a safe state.

A problem has also existed in that the less expensive microcomputer chips only include eight bit pulse width modulators. When the output of an eight bit pulse width modulator is used to control a DC motor of a wheelchair, the resolution is noticeably coarser than for analogue control. To date it has not been possible to obtain similar performance to analogue controllers using microcomputers having eight bit pulse width modulators.

Further, the mounting of components, such as semiconductors, in casings has been labour intensive, as has been the need to connect wires from a circuit board to a component secured to the casing. Servicing and replacement is also difficult.

DISCLOSURE OF THE INVENTION

It is an object of the present invention to provide a control means for electrically driven vehicles which overcomes at least some of the above problems or at least provides the public with a useful choice.

According to a first aspect of the invention there is provided a control means for an electrically driven vehicle comprising two or more modules interconnected by a serial bus, said serial bus including one or more data lines, wherein one or more module includes means to shift a DC bias voltage on a data line of said serial bus and one or more module includes means which monitors the DC voltage on said data line of serial bus and disables functions of the module when the detected DC bias voltage is outside a set voltage range. Preferably the serial bus has two data lines, only one of which is biased by the DC bias voltage. Preferably all safety related modules are disabled when the DC bias voltage is outside the set voltage range and all modules can vary the DC bias voltage on the serial bus.

The invention further provides a module for use in a modular control means for an electrically driven vehicle, the modules of said modular control means being interconnected by a serial bus, wherein the module includes kill means to disable functions of the module upon detecting that the DC bias level on a data line of the serial bus is outside a set range. The invention also provides a method of disabling modules of a control,means for an electrically driven vehicle, said modules being interconnected by a serial bus having one or more data lines, said method comprising applying a DC bias voltage within a set voltage range to one of the data lines to enable the modules and shifting the DC bias voltage outside the set voltage range to disable functions of the modules.

According to a further aspect of the invention there is provided a module for use in a modular control means for an electrically driven vehicle, the modules of said modular control means being interconnected by a serial bus, wherein the module includes means to disable functions of the module upon detecting that the DC bias level on a data line of the serial bus is outside a set range.

According to a further aspect of the invention there is provided a method of controlling a pulse width modulator to drive a DC motor, the pulse width modulator having N input bits and the method comprising:

inputting a required motor speed value consisting of N+M bits to a processor at the beginning of a sampling period;

for a number of pulse width modulator cycles adding 1 bit or nothing to the N bits, dependent upon the value of the M Bits, to produce a plurality of output values of N bits which over a sampling period represent an average output substantially equal to N+M;

and outputting the output values from the processor to the pulse width modulator. Preferably the sampling period is $2^M$ pulse width modulator cycles.

According to a further aspect of the invention there is provided a module for use in a modular control means for an electrically driven vehicle, the modules of said modular control means being interconnected by a serial data bus, wherein the module includes wake-up means which monitors the DC bias level of a data line of the serial data bus when the module is deactivated and supplies power to the module upon detecting that the DC bias level is outside of a set range.

According to a still further aspect of the invention there is provided a control means for an electrically driven vehicle comprising a plurality of modules interconnected by a serial bus, each module storing network variables required for the operation of that module in memory; external network variables required by that module being updated via the serial bus at a required rate from the module from which the network variable originates.

Preferably the modules act as finite state machines with transitions between states being dependent upon the state of system network variables.

BRIEF DESCRIPTION OF THE DRAWINGS

The invention will be described by way of example with reference to the accompanying drawings in which:

The wheelchair controller of the present invention is preferably of modular design with distributed intelligence (i.e. each module includes a processor). FIG. 1 shows a possible arrangement of modules and their interconnection. FIG. 1 shows an arrangement for a wheelchair controller where steering is effected by the differential speed between two driving motors. For other applications, such as scooters, only one motor need be controlled.

Figure 1:
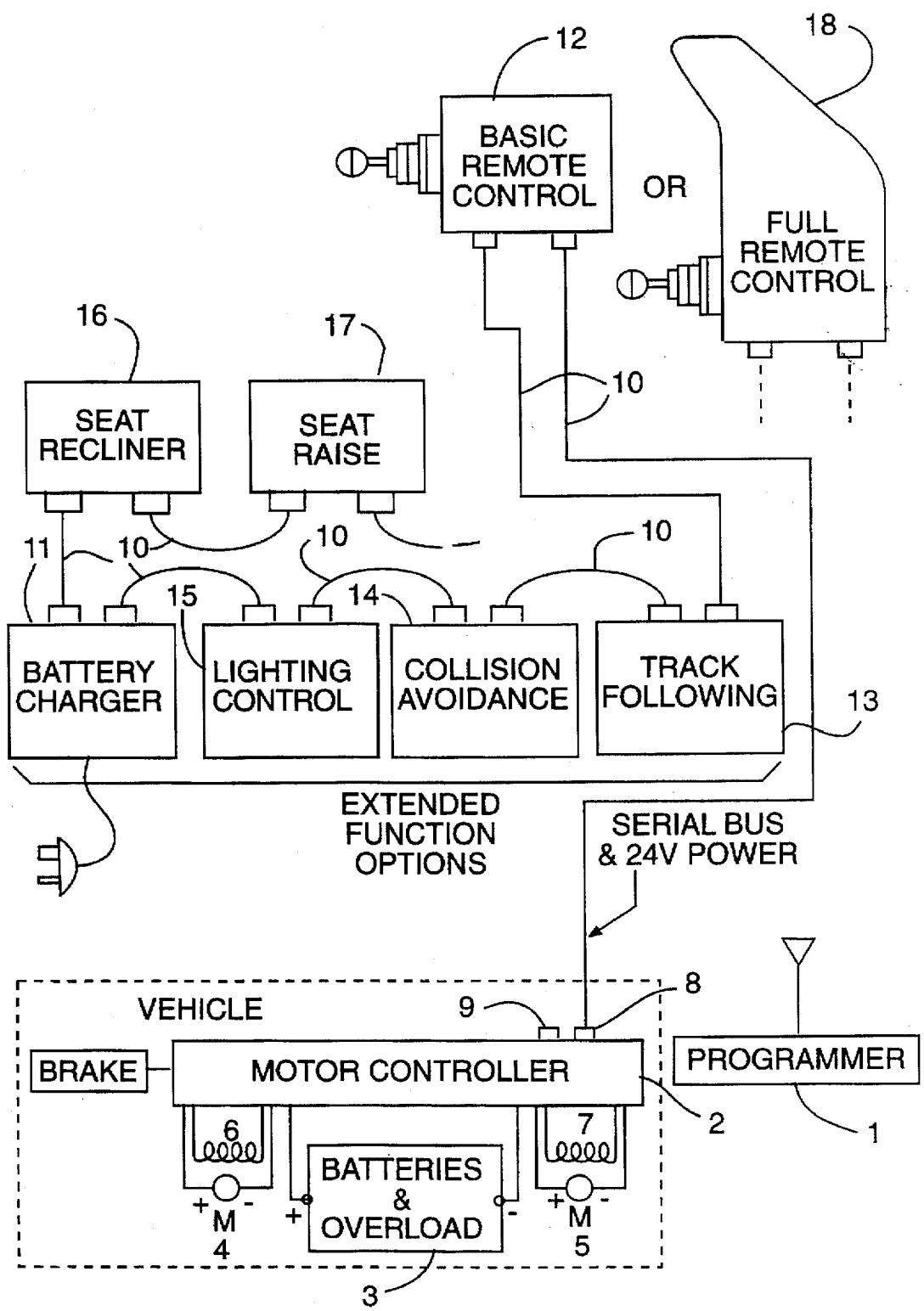
FIG. 1: Shows a possible modular wheelchair controller configuration.

Instead of a single controller for both motors (as shown in FIG. 1) two separate controllers may be provided for each motor. The separation of motor controller modules has the advantage that the motor controllers may be mounted in close proximity with the motor. This enables an entire motor controller and motor to be replaced should a fault arise. Furthermore, this arrangement facilitates temperature sensing of the motor. Combining two motor controllers in a single unit does however simplify manufacture and reduce cost.

In the arrangement shown in FIG. 1 motor controller 2 is directly connected to batteries 3. As the motor controller has high power demands it is desirable that it be connected directly to the battery supply. Left and right motors 4 and 5 and parking brake. solenoids 6 and 7 are also directly connected to the motor controller 2.

Each module in FIG. 1 includes input/output ports 8 5 and 9 to allow interconnection of modules via serial bus 10. The serial bus preferably includes two power supply lines to provide power from the motor controller to peripheral devices or to allow charging of battery 3 from a battery charger unit 11. Such lines will be current limited (to say 15 amps). The serial bus preferably comprises a two line differential serial data bus comprising the signal lines $CAN_{13}$ H and CAN_L. Although the system can operate on one line, two lines are preferred for noise immunity and reliability (i.e.: communication is still possible if one line fails).

The system will preferably operate under the highly secure CAN protocol used in ABS braking systems. This protocol is preferred due to its noise immunity, and four level error checking. A high degree of reliability is required for wheelchair controllers where faulty operation may cause personal injury.

The daisy chain interconnection of modules means that a relatively slow data rate (100 Kbit/sec) must be used to avoid signal reflection. This is not a problem as the rate of data exchange required for a wheelchair controller is not great. The arrangement however provides great flexibility in allowing additional modules to be added as required merely by plugging in the new module and reprogramming the system. A further module can then be connected to the available port of the new module, and so on.

A basic system will comprise a motor controller 2 and a basic remote control 12. Further peripheral devices may be added such as track following 13, collision avoidance 14, lighting control 15, seat recliner 16 and seat raise 17 modules. Further specialised modules may be added such as breath, head and voice input control devices; visual displays including lamps, LED's and matrix displays; synthesised speech modules; robot manipulator arms; navigational aids such as collision avoidance aids and track following guidance systems; battery charger modules; environmental control units and computer and telephone interfaces.

The basic remote module 12 may include only a joystick for a user to control the direction of motion. When further peripheral modules are added a full remote control 18 may be substituted for the basic remote 12. The full remote may include a number of switches to actuate the peripheral modules. The full remote may have a first row of switches which allow an operator to select a module to be controlled (e.g. seat raise). Upon selection of the module to be controlled a second row of switches (incorporating displays therein or adjacent thereto) may present the control options associated with that module. For example LCD's may be provided in the top of these switches displaying functions associated with that module (eg raise front of seat, raise back of seat, raise left side of seat, raise right side of seat etc). In this way if for example eight switches are provided to select modules and eight switches are provided to control the functions of each module, then 64 functions can be provided from 16 switches. Further this system gives flexibility to add new functions merely by reprogramming.

A major advantage of the modular configuration described is that a system can be expanded without, requiring physical modification or replacement of large parts of the system. As new modules are added the system can be reprogroomed via programmer 1 so that the remote control, for example, will know of the existence of the new module and will allow communication with the new module. Preferably the remote control module 12 and the motor controller module 2 store the entire system configuration so that a replacement module for a faulty module may be automatically configured upon connection to the system. Programmer 1 can be connected to any available port on the system and may be used for reprogramming or diagnostics. Programmer 1 may be used to programme user control parameters such as preferred seat position and response speeds.

Figure 2:
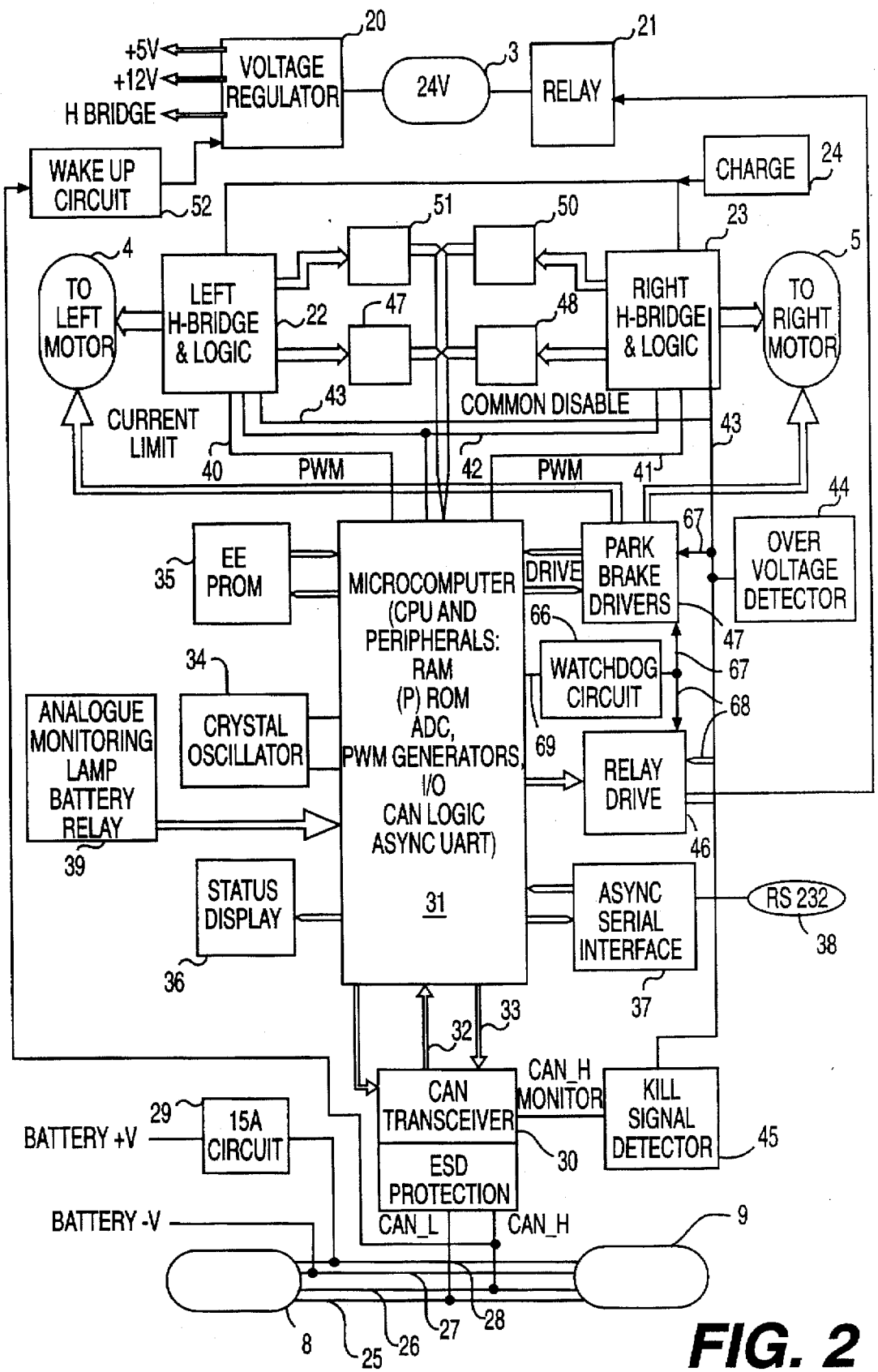
FIG. 2: Shows in block diagram form the circuit of a motor controller module shown in FIG. 1.

Referring now to FIG. 2. a block diagram of the motor controller 2 of FIG. 1 is shown. The circuit is a DC motor controller implementing digital servo control. 24 volt battery 3 is connected directly to voltage regulator 20 and relay 21. Voltage regulator 20 supplies 5 and 12 volt power supplies to the circuitry of the controller. Relay 21 switches the direct battery supply to the left H-bridge 22 and right H-bridge 23. A pre-charge circuit 24 is provided to raise the voltage across large capacitors on the H-bridge side of the relay to within a few volts of the battery voltage. This is to ensure that the relay contacts are not damaged by a rapid inrush of current following connection of the H-bridges, with associated large capacitances, to the battery supply.

Looking at the bottom of FIG. 2 the DX bus connectors 8 and 9 of FIG. 1 are shown. The bus is seen to consist of data lines CAN_L (25) and CAN_H (26) and power supply lines: battery negative 27 and battery positive 28. The battery positive line 28 is limited to a maximum current of 15 amps by circuit breaker 29. The power supply lines 27 and 28 supply power to all of the modules connected on the serial bus. Likewise, all modules communicate over the CAN_L and CAN_H data lines.

Signals from the lines CAN_H and CAN_L pass to CAN transceiver 30. Communications are transferred from CAN transceiver 30 to microcomputer 31 via line 32 and from microcomputer 31 to CAN transceiver 30 via the two transmit data lines 33.

Microcomputer 31 is preferably a Philips 80C592 or a Philips 87C592 microcomputer. This microcomputer includes a central processing unit, RAM, ROM, an analogue to digital converter, a pulse width modulator generator, CAN logic circuitry, UART and input/output interfaces. A crystal oscillator 34 is connected to microcomputer 31 to set the frequency of the internal clock. Electrically erasable, programmable read only memory (EEPROM) 35 is connected to microcomputer 31 to enable the storage of fixed configuration and/or user parameters. A status display 36 is driven by microcomputer 31 to display status messages. An asynchronous serial interface 37 connects microcomputer 31 to an RS232 port 38. Analogue monitoring of the motor and circuit temperatures, battery voltage and relay contacts is performed by analogue monitoring circuitry 39. These analogue values are supplied to the analogue to digital convertor of microcomputer 31.

Pulse width modulator outputs from microcomputer 31 are supplied to the driving logic of the H-bridges 22, 23 via lines 40 and 41. A current limit value is supplied to the driving logic 22, 23 via line 42. A common disable line 43 connected to the H-bridge logic circuits allows the H-bridges to be disabled. The H-bridges may be disabled in response to an over-voltage being detected on either H-bridge by over-voltage detection circuitry 44. Alternatively, the H-bridge may be disabled in response to the detection of a kill signal on the serial bus by kill signal detector 45. Motor speed detectors 50 and 51 measure the motor voltages across points 56a and 58a of FIG. 3 and supply the voltages to the microcomputer via RC filters. Motor current detectors 47 and 48 provide signals representative of the motor currents to microcomputer 31 (see FIGS. 3 and 4).

Isolation relay 21 is driven by relay drive 46 in response to commands received from microcomputer 31. Relay drive 46 is also responsive to signals from kill signal detector 45 or over-voltage detector 44 or watchdog circuit 66 to isolate the H-bridges from the relay. Park brake drivers 47 are responsive to commands from microcomputer 31 to apply and release the park brakes. Park brake drivers 47 are alto responsive to the watchdog circuit and kill signal detector to apply the park brakes. Wake up circuit 52 is responsive to the bias level on CAN_H to supply an enabling signal to voltage regulator 20 if it is off. Preferably a high bias of CAN_H causes wake up circuit 52 to enable voltage regulator 20.

Figure 3:
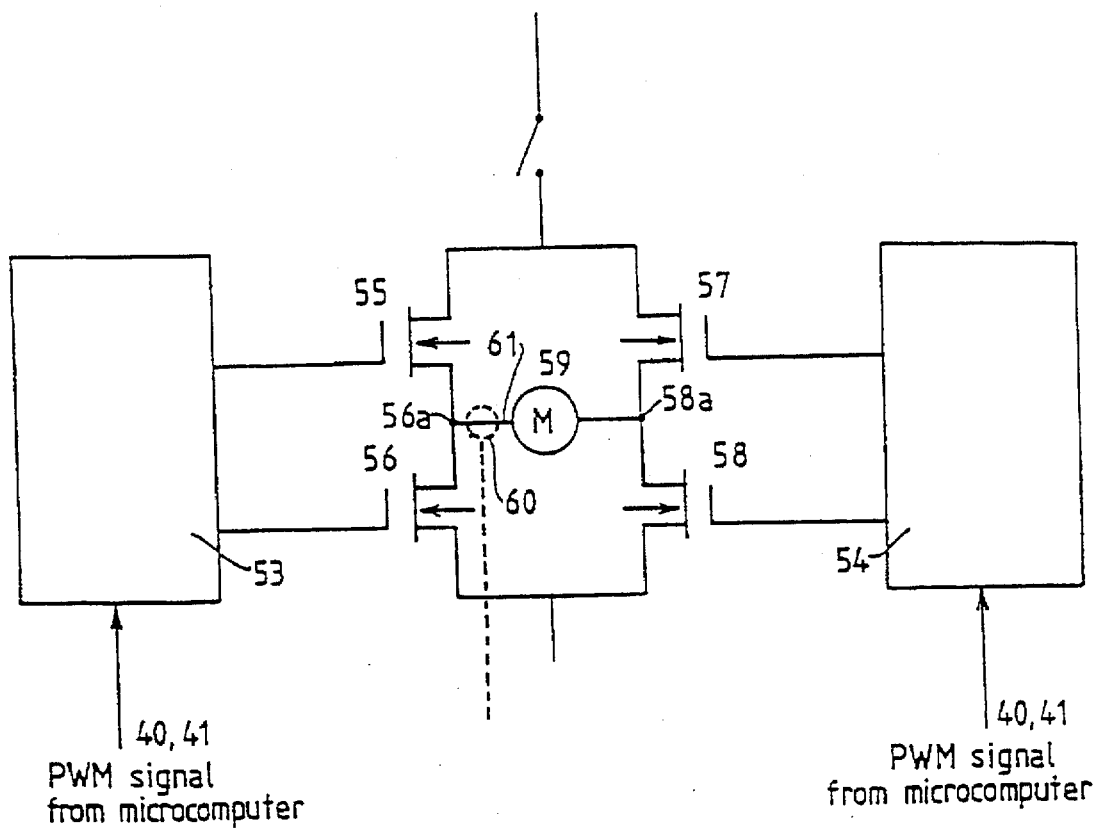
FIG. 3: Shows a functional diagram of a MOSFET H-bridge and driving logic of the circuit of FIG. 2.
Figure 4:
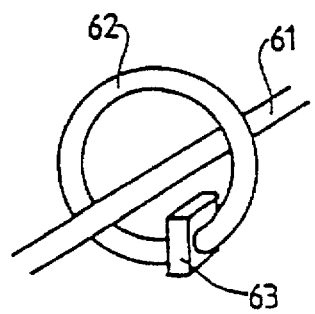
FIG. 4: Shows the current sensor used in the circuit of FIG. 3.

Referring now to FIG. 3 a functional diagram of an H-bridge and driving logic 22 or 23 is shown. This diagram does not show all of the necessary components for a working bridge and is merely for the purpose of explaining the general operation of the H-bridges.

Pulse width modulator driving signals 40, 41 from microcomputer 31 are supplied to driving logic 53 and 54. Driving logic 53 and 54 is preferably based on linear technology LT1158 chips. Bridge logic 53 drives power MOSFETS 55 and 56 and bridge logic 54 drives power MOSFETS 57 and 58. MOSFETS 55 to 58 may consist of two MOSFETS driven in parallel to cope with the required current in an economical manner and provide redundancy should one MOSFET fail. DC motor 59 is connected across the points of interconnection 56a and 58a of MOSFETS 55 and 56 and MOSFETS 57 and 58. Motor current is sensed by a hall effect sensor 60 (shown in FIG. 4). This sensor consists of a loop of high permeability magnetic material 62 passing about conductor 61 with a hall effect sensor 63 within the gap in loop 62. The output of the hall effect sensor is supplied to the microcomputer.

Figure 5:
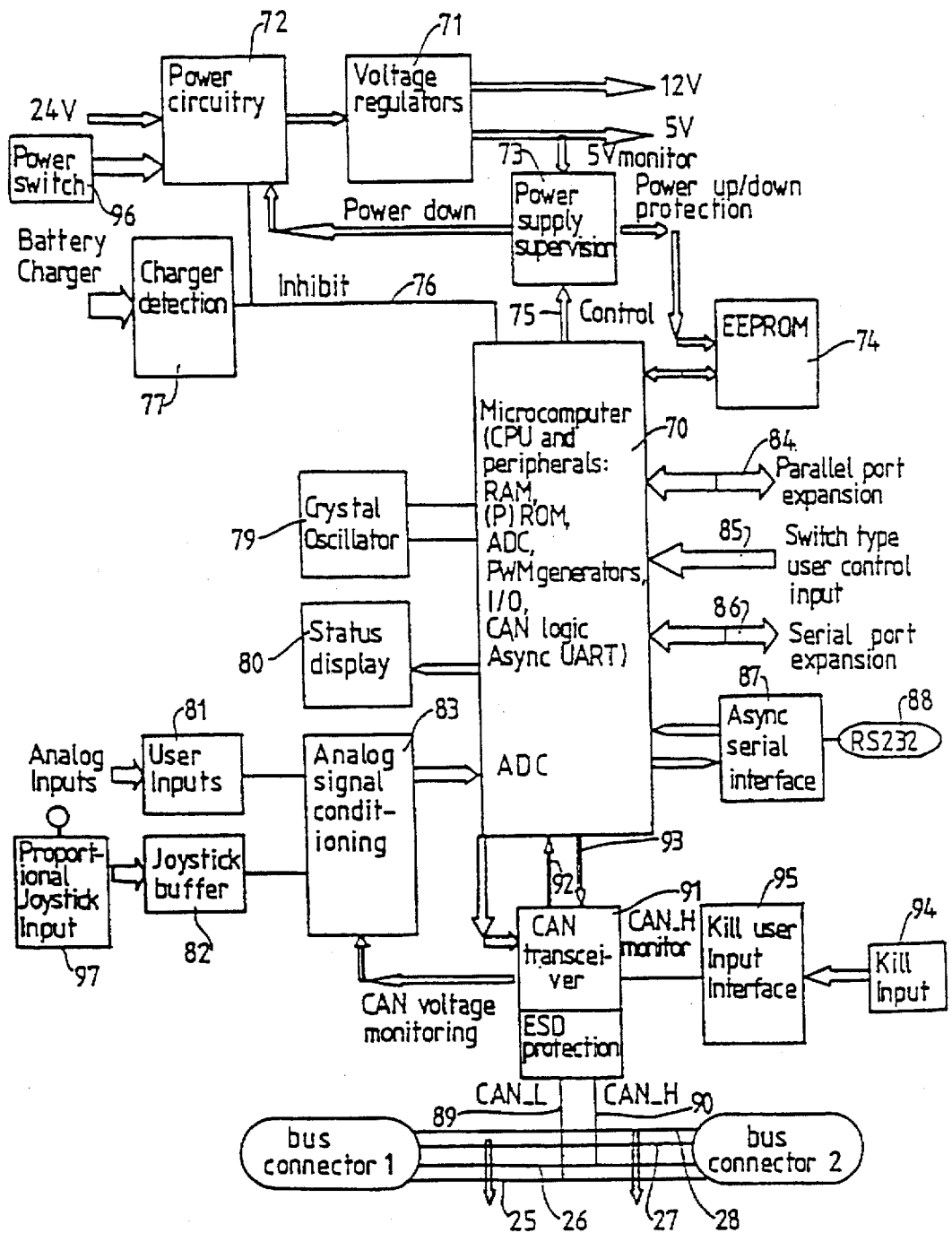
FIG. 5: Shows in block diagram form a remote control module suitable for use with the motor controller module of FIG. 2.

Referring now to FIG. 5 a remote control unit (12 or 18 in FIG. 1) is shown. Again the circuit is based on a Philips 80C592 or 87C592 microcomputer 70. Upon actuation of a power switch 96 the 24 volt DC supply is supplied to voltage regulator 71 via power circuitry 72. Voltage regulator 71 provides 5 and 12 volt supplies to the internal circuitry. Power supply supervision circuit 73 monitors the 5 volt supply to EEPROM 74 and disables power circuitry 72 if there is a failure in the 5 volt supply or in response to a control command from microcomputer 70 via line 75. Microcomputer 70 may also inhibit the power supply via line 76, connected to an inhibit input of power circuitry 72. Charger detection circuit 77 inhibits power circuit 72 via inhibit line 76 when charging is detected. This is to ensure that the circuitry is not exposed to transient variations which may occur during charging and to provide a signal to microcomputer 70 to disable driving of the wheelchair. Crystal oscillator 79 sets the frequency of operation of the microcomputer 70. Status display 80 enables status information from the microcomputer to be displayed. Analogue user inputs 81 are supplied to the analogue to digital converter of microcomputer 70 via analogue signal conditioning 83. This allows a wide variety of analogue control inputs to be input to the microcomputer 70. Inputs from the joystick 97 are supplied to joystick buffer 82, which are input to the analogue to digital converter of microcomputer 70 via analogue signal conditioning circuitry 83. Parallel port expansion is provided by parallel input/output bus 84. Serial port expansion is possible via serial interface 86. These expansion ports allow circuitry specific to a particular module to be interfaced with microcomputer 70. It is to be appreciated that other modules may be based on the circuit of FIG. 2 with appropriate modifications for the particular module function; e.g.: actuator/motor driver circuitry for a seat reclining module. Switch inputs may be supplied to microcomputer 70 via input/output interface 85. An asynchronous serial interface 87 connects microcomputer 70 to RS232 port 88. This enables communication with a computer or other device fitted with an RS232 interface.

Lines 89 and 90 connect CAN transceiver 91 to data lines CAN_L and CAN_H of the serial bus. Data received by CAN transceiver 91 is supplied to microcomputer 70 via receive line 92 and data to be transmitted from microcomputer 70 is supplied to CAN transceiver 91 via two lines 93. A kill switch 94, is supplied on the remote control module to enable a user to disable all modules of the system. Upon detecting actuation of the kill switch 94, kill input interface 95 sends a signal to CAN transceiver 91 which causes it to bias the data line CAN_H (as, will be described in more detail hereinafter). The operation of kill input interface is independent of the operation of microcomputer 70.

The operation of a simple system consisting of the remote module of FIG. 5 and motor controller of FIG. 2 will now be described with reference to FIGS. 2 to 5. Referring firstly to FIG. 5, a user actuates the remote module by depressing power switch 96. This enables power circuitry 72 which supplies power to voltage regulator 71. Power is thus supplied to the remote module. Actuation of switch 96 or movement of the joystick may be detected by microcomputer 70 and cause it to instruct the CAN transceiver 91 to bias CAN—H high for a predetermined period. This will be detected by wake up circuit 52 of the motor controller (FIG. 2) which will activate voltage regulator 20 and supply power to the circuitry of the motor controller. In a larger system the other modules would also be activated in this way. The modules may be turned off by commands transmitted over the serial bus.

To move the wheel chair a user then moves the arm of joystick 97 in the desired direction of motion. Signals representative of the position of the joystick are supplied to the analogue to digital converter of microcomputer 70 via buffer 82 and signal conditioning circuitry 83. Microcomputer 70 then computes required direction and speed network variables, dependent upon the system configuration for the user (stored in EEEPROM). Microcomputer 70 then transmits the required direction, and speed network variables and module status information to microcomputer 31 via CAN transceivers 91 and 30 over the interconnecting serial lines of the serial network. Upon receiving the desired speed and direction information microcomputer 31 calculates the required pulse width modulator outputs to achieve the required speed and direction.

The back EMF of a DC motor is equal to the voltage across the motor minus the motor resistance times the current flowing through the motor. Thus;

$$\text{back } EMF = K_e * \frac{dw}{dt} = V_m - I_m * R_m$$

Where $K_e$ is a constant, $$\frac{dw}{dt}$$

is the motor speed and $V_m$, $I_m$ and $R_m$ are the motor voltage, current and resistance respectively.

Accordingly the back EMF can be calculated by subtracting the voltage at point 58a from the voltage at point 56a, then subtracting the current flowing through the motor (measured by sensor 60) times the motor resistance. This motor back EMF feedback value may be compared with the required motor speed and direction network variables to determine the required output of the pulse width modulator for each bridge. The outputs of the pulse width modulator are supplied to H-bridge logic 53, 54 which supply the signals which drive the MOSFET H-bridges. MOSFETs 55 to 58 are in a full H-bridge configuration to allow bidirectional motor drive. N channel devices are used for cost and performance advantages.

The MOSFETs of the bridge are switched in two phases. In phase 1 MOSFETs 55 and 58 are switched on whilst MOSFETs 56 and 57 are off. In phase 2 MOSFETs 56 and 57 are on whilst MOSFETs 55 and 58 are off. The driving logic switches between phases when the detected voltage has decayed to a certain level. This results in a dead time which prevents simultaneous conduction through the FETs on one side. Over-current in the MOSFETs is detected by monitoring the voltages at 56a and 58a. In the "on" state MOSFETs can be modelled as a low value resistor. If excessive current is detected the drive pulse to that MOSFET is terminated for that cycle.

If phases 1 and 2 are of equal duration then the nett voltage output is zero. If phase one is greater than phase 2 the nett output is positive and the motor rotates in the forward direction. If phase 2 is longer than phase 1 the net output is negative and the motor rotates in reverse.

A battery voltage input and isolated battery input are supplied to the analog to digital converter of the micro computer via analogue monitoring circuit 39. If low battery voltage is detected, say below 22 volts, then the available current is decreased to prevent surging and to preserve power. If the battery voltage drops below 18 volts the motors may be disabled to ensure there is sufficient power to operate isolation relay 21 and the park brakes. If the battery voltage rises above a set level, say 32 volts, the microcomputer will ramp back driving signals and prevent further driving until the voltage returns to a normal range. The voltage on the H-bridge side of the isolation relay 21 is also monitored. By comparing this value with the battery voltage, faulty contacts in relay 21 can be detected as well as checking for faults in the microcomputer between the stored status and actual status of the relay. If it is detected that there is a disagreement between the relay state stored in memory and the actual state then the power module enters a fault mode and prohibits further driving. Temperature sensors monitor the temperature of the controller (and possibly the motors too) and provide signals to the analogue to digital converter of the micro computer indicative of the temperatures. If high controller temperature is detected then the available current to the motor is decreased to prevent overheating.

Non-volatile memory 35 stores programmable parameters, configuration data and settings which may be altered by a programming module when connected to the system.

An important feature of the invention is a method used to enable or disable safety related modules (i.e. motor driver and actuator modules) connected to the serial data bus (herein referred to as the "kill function"). Accordingly to this method a DC bias voltage level is superimposed on one or both of the serial data lines 25, 26. It is preferred that only one line (CAN_H) is biased so that communication may continue on the other line when the "kill function" is activated. If the DC bias voltage level is within a given range, safety related modules will be enabled. When the DC bias voltage is in this range serial communications from one module to another may actuate the motor controllers or peripheral devices to perform the desired functions. If a fault occurs in a module the DC bias voltage may be shifted outside of the given range. The DC bias level may be shifted either high or low. Preferably when the "kill function" is invoked by the microcomputer of a module the DC bias level on CAN_H will be raised above the highest value of the given range; typically above 8.4 volts (a "high" bias). When the "kill function" is invoked by a "dead mans switch" the DC bias level on CAN_H will preferably short CAN_H to ground (i.e. a "low" bias voltage of below 0.6 v).

Each safety related module includes circuitry to detect the bias level of the CAN_H line. If a module detects a high or low DC bias on CAN_H certain functionality of the module will be physically disabled (i.e: actuators and motors), independent of the operation of internal software.

Figure 6:
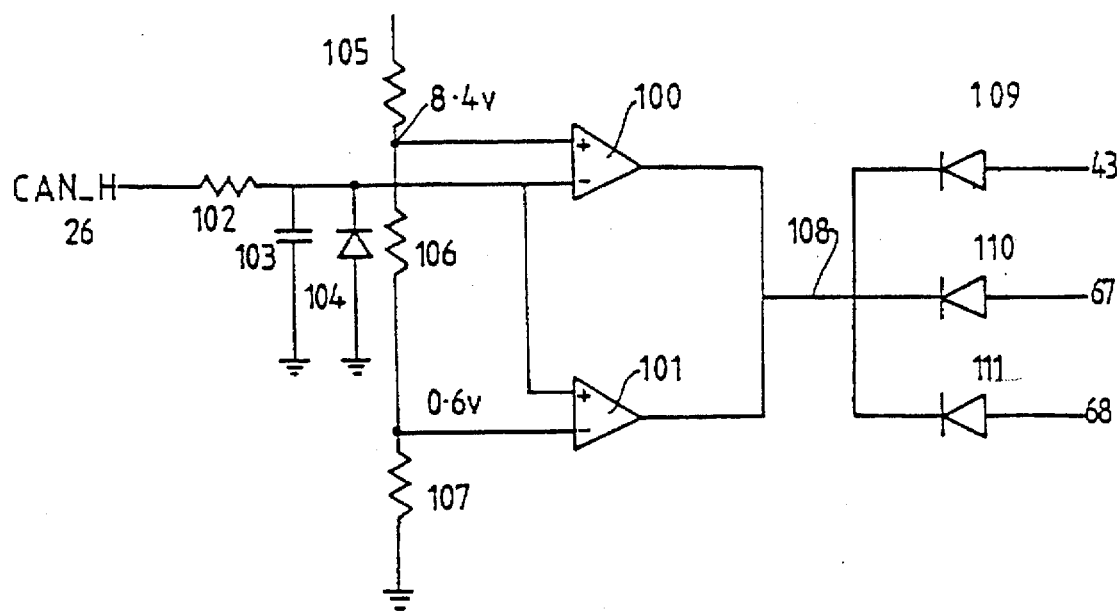
FIG. 6: Shows a possible "kill function" detection circuit.

Referring now to FIG. 6 a possible "kill function" circuit for each module is shown. An input from the data line CAN_H is supplied to the inverting input of comparator 100 and the non-inverting input of comparator 101 via a resistor 102, capacitor 103 and diode 104 conditioning arrangement. Resistor network 105, 106 and 107 forms of a voltage divider which provides an 8.4 volt input to the non-inverting terminal of comparator 100 and a 0.6 volt input to the inverting input of comparator 101. When the bias voltage on CAN_H is within the 0.6 to 8.4 volt range the output 108 of comparators 100 and 101 is high. When the DC bias voltage on CAN_H exceeds 8.4 volts or drops below 0.6 volts then the output 108 is pulled low. This results in the H-bridge disable line 43, the park brake disable line 67 and the relay isolation line 68 being pulled low. This results in the H-bridge being disabled, isolation relay 21 being opened and the park brake being applied.

There will preferably be a time delay (for example 1 second) before the "kill function" is invoked. This gives the motor controller microcomputer a chance to smoothly ramp down motor voltages to bring the chair to a smooth stop. However, after the predetermined period, say 1 second, the "kill function" will be invoked regardless of the operation of the microcomputer 31. If a high or low DC bias on CAN_H (i.e. above 8.4 volts or below 0.6 volts) is detected for a specified time the microcomputer 31 will configure the CAN communication hardware so that it can continue to communicate with other modules. Such communication will be conducted over CAN_L only as CAN_H will still be biased outside normal operating range. Although motors and actuators will be disabled some functionality may remain when the kill function is invoked. For example, a user may still be able to use a phone interface to call for help.

This method of inhibiting modules has the advantage that all safety related modules may be quickly inhibited regardless of whether or not data communications are occurring on the serial bus. Further, modules may be inhibited physically irrespective of the operation of controlling software. By using a DC bias voltage to control the inhibit function on the serial data bus the need for an additional dedicated inhibit wire is overcome.

As well as the "kill function" the motor controller module has an external watchdog function. Every millisecond the microprocessor 31 toggles the WDOG port pin 69, creating a 500 hertz square wave. This is capacitively coupled to a filter to produce a 2.5 volt reference voltage. If microcomputer 31 stops toggling the WDOG pin 69 (due to oscillator failure for example) the 2.5 volt reference voltage will decay to become zero volts. Whether the WDOG pin ceases oscillating in either the high or low state the capacitive coupling ensures that the output voltage of watchdog circuit 66 will be zero volts.

Figure 7:
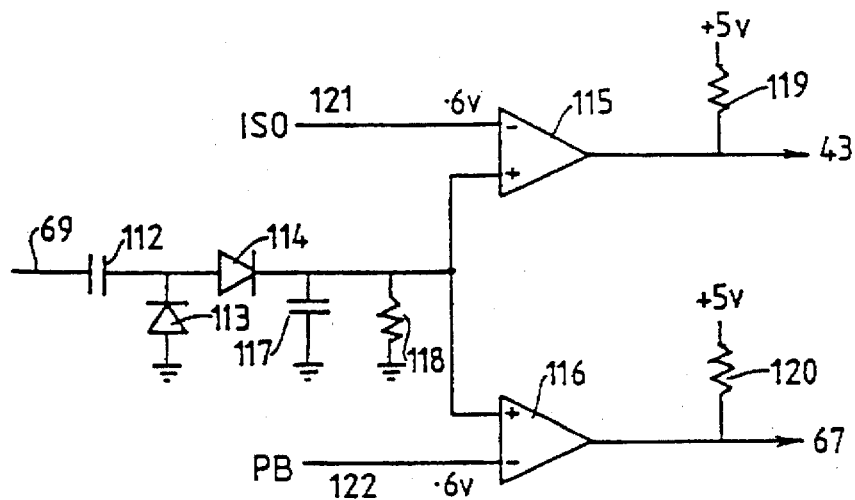
FIG. 7: Shows a possible external watchdog detection circuit.

A possible external watchdog circuit is shown in FIG. 7. The output of WDOG pin 69 is supplied via capacitor 112 and diode pump 113, 114 to the non-inverting inputs of comparators 115 and 116. Conditioning capacitor 117 and resistor 118 are also provided. Resistors 119 and 120 hold the outputs of comparators 115, 116 in the normally high condition. While the wheelchair is driving the comparator inputs ISO (121) and PB (122) will be held low by the processor (i.e. the isolation relay 21 is closed and the park brake solenoids are energized). This low state is typically about 0.6 volts. Thus, when the WDOG pin is oscillating at 500 hertz the input voltage to the non-inverting inputs of comparators 115 and 116 would typically be about 2.5 volts. Thus, the outputs of both comparators will be high. When the input voltage to the non-inverting terminals of comparators 115, 116 goes below 0.6 volts (i.e. when the output of WDOG pin 69 stops oscillating) the comparator outputs go low and pull relay drive enable line 68 and park brake enable line 67 low. This engages the park brakes and opens the isolation relay 21. This ensures that when there is a microcomputer failure the motor drive is disabled and park brakes enabled. Further to the external watchdog function described above the microcomputer includes an internal watchdog function which will disable outputs when an internal fault is detected.

The method of communication between modules and system operation will now be described. The present invention aims to provide a modular system which can be easily expanded or reconfigured as-required. To enable modules to communicate information relating to state and system variables a system using network variables has been provided. According to the system of network variables of the present invention each module stores within its own memory the system state and variable information it requires to operate. Each module periodically supplies over the network the network variables required by other modules. In this way the modules of the system have virtual shared memory in relation to network variables.

Network variables may include bits, semaphores, bytes or words. Bits are singe bit values indicating status. Semaphores consist of multiple bits which indicate the state of a module. Each module state has a unique semaphore in its "state machine register" (described in more detail hereinafter). Bytes consist of 8 bits and words consist of 16 bits. System variables are typically transmitted as bytes or words. States are transmitted as bytes. Several status bits may be combined into a byte or word for efficiency of transmission. Such status bits may form status flag bytes or words which may be continually transmitted. An example of the possible dynamic network variables for a dual motor controller module (as shown in FIG. 2) is given in table 1. The network variables of type 0 are those obtained within the module which may be output to other modules requiring that network variable. The network variables of type I are those obtained from other modules; in this case speed and direction demands from the control module and the state of the control module. The dynamic network variables may be stored in the RAM during operation, although default values may be stored in EEPROM and loaded into RAM at start up.

TABLE 1

Dynamic Network Variables of a Motor Controller Module

| NV No. | Network Variation | Type | Description |
| --- | --- | --- | --- |
| 1 | PM SM | O | Current state of PM state machine |
| 2 | UCM SM | I | Current state of UCM state machine |
| 3 | UCM SPEED | I | Speed demand from UCM demand |
| 4 | UCM direction demand | I | Direction demand |
| 5 | PM RM demand | O | Right motor demand voltage |
| 6 | PM LM demand | O | Left motor demand voltage |

TABLE 1-continued

Dynamic Network Variables of a Motor Controller Module

| NV No. | Network Variation | Type | Description |
|---|---|---|---|
| 7 | PM PWM 0 | O | PPWM 0 (controlling right output) register contents |
| 8 | PM PWM 1 | O | PPWM 1 (controlling left output) register contents |
| 9 | PM LM +ve terminal voltage | O | +ve terminal voltage of left motor |
| 10 | PM LM –ve terminal voltage | O | –ve terminal voltage of left motor |
| 11 | PM RM +ve terminal voltage | O | +ve terminal voltage of right motor |
| 12 | PM RM –ve terminal | O | –ve terminal voltage of right motor |
| 13 | PM battery voltage | O | Average battery voltage |
| 14 | PM isolated battery voltage | O | Average battery voltage, isolated by relay |
| 15 | PM right temperature | O | Right thermistor voltage |
| 16 | PM left temperature | O | Left thermistor voltage |
| 17 | R Motor current | O | Right motor current output level |
| 18 | L motor current | O | Left motor current output level |
| 19 | PM temperature scaler | O | Software current limit threshold scaler |

Abbreviations:
PM: Motor controller module
UCM: Remote Control module
LV: Logical variable
LM: Left motor
RM: Right motor
SM: State machine
I: Input
O: Output
B: Byte
W: Word Examples of programmable variables and control register values are given in tables 2 and 3. These values will be stored in non-volatile memory (i.e. EEPROM) at the time of configuration of the system.

TABLE 2

Motor Controller Module Programmable Variables

| NV No. | Variable | Default | Description |
|---|---|---|---|
| 1 | Left motor resistance | 29 | Left motor load compensation setting |
| 2 | Right motor resistance | 29 | Right motor load compensation setting |
| 3 | Motor test stimulus level 1 | 128 | Fwd drive (+ve voltage) motor test voltage |
| 4 | Motor test stimulus level 2 | 128 | Reverse drive (–ve voltage) motor test voltage |
| 5 | Motor test criterion 1 | 44 | Maximum acceptance voltage on test |
| 6 | Motor test criterion 2 | 6 | Minimum acceptance voltage on test |
| 7 | Motor test criterion 3 | 64 | Maximum acceptance current on test |
| 8 | Motor test criterion 4 | 2 | Minimum acceptance current on test |
| 9 | H-bridge test criterion 1 | 128 | Maximum acceptance voltage (for test of topside MOSFET'S of H bridge) |
| 10 | H-bridge test criterion 2 | 80 | Minimum acceptance voltage (for test of bottomside MOSFET's of H-bridge) |
| 11 | PM control 1 | 162 | Config'n bits 0–7, refer below for bit designations |
| 12 | PM control 2 | 109 | Config'n bits 8–15, refer below for bit designations |
| 13 | PM control 3 | 24 | Config'n bits 16–23, refer below for bit designations. (Common to all DX modules) |
| 14 | PM status | 0 | Status bits, refer below for bit designations. |
| 15 | Maximum motor voltage | 96 | Motor voltage vs battery voltage ceiling (normally 24V) |
| 16 | PWM frequency control | 1 | PWH prescaler control register |
| 17 | Fault deceleration rate, overall | 14 | Overall deceleration rate when fault detected |
| 18 | Fault deceleration rate 1 | 2 | Final (low demand) deceleration rate when fault detected |
| 19 | Fault deceleration rate 2 | 128 | Initial (high demand) deceleration rate when fault detected |
| 20 | Park brake delay | 0 | Delay before park brake actuated |
| 21 | DX bus comms fault time out | 13 | Time out duration |
| 22 | Speed and direction demand scaler | 229 | Scaler to allow headroom for steerage at maximum speed |
| 23 | Veer Compensation scaler | 128 | Left or right veer compensation |
| 24 | Decryption key | 0 | Protection key |
| 25 | Module ID high | 1 | Module CAN identifier, byte (8 bits) |
| 26 | Module ID low | 0 | Module CAN identifier, low byte (3 bits) |
| 27 | Software current limit | 32 | Motor output current limit |
| 29 | PWM step size (when in current limit) | 1 | PWM step size when output in software current limit and PWM reduced. |
| 30 | PWM step size (when in recovering from current limit) | 8 | PWM step size when output recovering from software current limit and PWM increased. |
| 31 | Onset of thermal rollback of output current | 100 | Thermal rollback lower temperature threshold |
| 32 | Thermal rollback 0 output limit | 140 | Thermal rollback upper temperature limit (corresponding to 0 output current) |
| 33 | RS232 comms time out | 5 | RS232 comms time out duration |
| 34 | I$^2$t threshold | 165 | I$^2$t threshold as a percentage of software current limit |
| 35 | CAN accept code | 0 | Microcomputer CAN acceptance mask register |
| 36 | Motor stall time out | 255 | Motor stall duration limitation |
| 37 | CAN mask code | 255 | Microcomputer CAN mask register |

TABLE 2-continued

Motor Controller Module Programmable Variables

| NV No. | Variable | Default | Description |
|---|---|---|---|
| 38 | CAN bus timing 0 | 68 | Microcomputer CAN bus timing register 0 |
| 39 | CAN bus timing 1 | 204 | Microcomputer CAN bus timing register 1 |
| 40 | CAN output control | 249 | Microcomputer CAN output control register |

Notes to table 2:
1. All logical variables are byte sized.
2. Default values given in decimal.

TABLE 3

Motor Controller Module Test Registers

| Bit No. | Register Name | Default | Description |
|---|---|---|---|
| PM Control Register 1 | | | |
| 0–2 | Hardware current limit | 7 | Hardware current limit threshold 0 = 30A, 1 = 35A, 2 = 40A, 3 = 45A, 4 = 50A, 5 = 55A, 6 = 60A, 7 = 65A, |
| 3 | Park brakes config. | 1 | Dual or single park brake select. 0 = single, 1 = dual |
| 4 | Motor test 1 enable | 1 | Left and right motor tests with BIR closed enable. 0 = disabled, 1 = enabled |
| 5 | Park brake test enable | 1 | Left and right park brake test enable. 0 = disabled, 1 = enabled |
| 6 | BIR test enable | 1 | BIR welded and dirty contact test enable. 0 = disabled, 1 = enabled |
| 7 | Over voltage test enable | 1 | Test for battery voltage too high enable. 0 = disabled, 1 = enabled |
| PM Control Register 2 | | | |
| 0 | Serial Bus test | 1 | Bus test (DC voltage of CAN lines) enable. 0 = disabled, 1 = enabled |
| 1 | Motor test 2 enable direction | 1 | Left and right motor tests with BIR closed enable. 0 = disabled, 1 = enabled |
| 2 | Reverse motor drive enable | 0 | Normal or reversed motor drive direction (forward & reverse) select. 0 = normal (M+ > M− for fwd), 1 = reversed. |
| 3 | Stall time out enable | 0 | Motor stall time out. 0 = disabled, 1 = enabled |

Possible Dynamic variables for a remote control module are given in table 4, possible programmable variables are given in table 5 and possible user defined variables are listed in table 6. The user defined variables in table 6 will be set according to the level of a users disability.

TABLE 4

Remote Control Module Dynamic Network Variables

| NV No. | Name | Type | Description |
|---|---|---|---|
| 1 | UCM SM | O | Current state of UCM state machine |
| 2 | PM SM | I | Current state of PM state machine |
| 3 | Proportional control Y axis input | O | Raw joystick forward - reverse input value |
| 4 | Proportional control X axis input | O | Raw joystick left - right input value |
| 5 | Speed magnitude | O | Processed speed demand passed to PM |
| 6 | Direction magnitude | O | Processed direction passed to PM |
| 7 | Battery voltage | I | Filtered battery input (unscaled) |
| 8 | PM status | I | PM and accessory fault status |

Abbreviations:
LV: Logical Variable
SH: State machine
I: Input
O: Output

TABLE 5

Remote Control Module Programmable Variables

| LV No. | Name | Default | Description |
|---|---|---|---|
| 1 | Set up session time out | 10 | Session attempt time out period |
| 2 | Park brake application delay | 254 | Time allowed for PM to complete PB application |
| 3 | Park brake release delay | 22 | Time allowed for PM to complete PB release |
| 4 | Neutral time out | 3 | Time out period if joystick is in neutral |
| 5 | UCM configuration register 1 | 0 | UCM config'n bits 0–7, refer below for bit designations |
| 6 | UCM configuration register 2 | 0 | UCM config'n bits 0–7, refer below for bit designations |
| 7 | Module shared configuration register | 24 | Shared config'n bits 0–7 refer below for bit designations |
| 8 | Profile list pointer 1 | 17 | Profile list pointer 1 and profile pointer selector (separate nibbles) |
| 9 | Profile list pointers 2 and 3 | 50 | |
| 10 | Profile list pointers 4 and 5 | 4 | |
| 11 | Accel/decel' minimum step size | 64 | Acceleration/ deceleration step size when approaching target size |
| 12 | Accel/decel upper ramp | 169 | Acceleration/ deceleration (slope of speed curve) when current and target speeds similar |
| 13 | Accel/decel lower ramp | 2 | Initial acceleration/ deceleration (slope of speed curve) when current and target speeds differ greatly |

TABLE 5-continued

Remote Control Module Programmable Variables

| LV No. | Name | Default | Description |
|---|---|---|---|
| 14 | Accel/decel intercept | 86 | Speed intercept of upper and lower acceleration/ deceleration slopes |
| 15 | PJ neutral threshold | 26 | Proportional joystick neutral threshold |
| 16 | PJ neutral Y axis offset | 128 | Proportional joystick neutral offset for Y axis |
| 17 | PJ neutral X axis offset | 128 | Proportional joystick neutral offset for X axis |
| 18 | PJ forward gain | 44 | Proportional joystick gain calibration, for +Y axis or forward direction |
| 19 | PJ Reverse gain | 44 | Proportional joystick gain calibration, for -Y axis or forward direction |
| 20 | Left gain calibration scaler | 44 | Proportional joystick gain calibration, for -X axis or left direction |
| 21 | Right gain calibration scaler | 44 | Proportional joystick gain calibration, for +X axis or right direction |
| 22 | Decryption key | 0 | Protection key |
| 23 | Module ID high | 8 | Module CAN identifier, high byte (8 bits) |
| 24 | Module ID low | 0 | Module CAN identifier, low byte (3 bits) |
| 25 | RS232 comms time out period | 5 | Async serial interface (RS232) time out duration |
| 26 | CAN accept code | 0 | microcomputer CAN acceptance mask register |
| 27 | CAN mask code | 255 | microcomputer CAN mask register |
| 28 | CAN bus timing 0 | 68 | microcomputer CAN bus timing register 0 |
| 29 | CAN bus timing 1 | 204 | microcomputer CAN bus timing register 1 |
| 30 | CAN output | 249 | microcomputer CAN output control control register |

Notes to table 5:
1. All logical variables are byte sized.
2. Default values given in decimal.

TABLE 6

User defined variables

| LV No. | Name | Default | Description |
|---|---|---|---|
| 1 | Forward accel' rate | | |
| 2 | Forward decel' rate | | |
| 3 | Reverse accel' rate | | |
| 4 | Reverse decel' rate | | |
| 5 | Turning accel' rate | | |
| 6 | Turning decel' rate | | |
| 7 | Maximum forward speed scaler | | |
| 8 | Maximum reverse speed scaler | | |
| 9 | Low speed scaler | | |
| 10 | Turning speed scaler | | |
| 11 | Analogue speed input scaler | | |

TABLE 6-continued

User defined variables

| LV No. | Name | Default | Description |
|---|---|---|---|
| 12 | Analogue tremor damping input scaler | | |

Notes to above table:
1. All logical variables are byte sized.
2. Default values given in decimal.

Each network variable may have the following attributes:
i) type i.e: whether an adjustable parameter or logic variable.
ii) source—whether internal or external
iii) update rate—fast—(every 20 ms) or slow (every 200 ms)
iv) size of the variable (whether a byte or a word)
v) range—the acceptable range for a parameter. Each module performs range checking of variable parameters to ensure they are within range. The allowable range will depend upon the safety criteria for a particular configuration.
vi) default value Each module stores the network variables it requires in its own memory. If a module requires network variables to be updated it must transmit a request on the serial network requesting that the network variable be updated at a prescribed rate. The module which is the source of that network variable will then transmit the required network variable at the requested rate until a request to cease transmitting the network variable is sent. If two modules request the same network variable then a watchdog function monitors whether a request to stop sending the variable is sent by one of the modules. If so, a watchdog function will re-request that the network variable be updated so that the network variable will still be provided to the module requiring that network variable.

For a system having 16 modules a 4 bit unique module identification code may be assigned to each module.

Each module may store in a table:
i) the module identification code for the source module supplying a particular network variable;
ii) the memory address at which the network variable is stored in the source module, and
iii) the local address to which that network variable should be stored in the receiving module.

Figure 8:
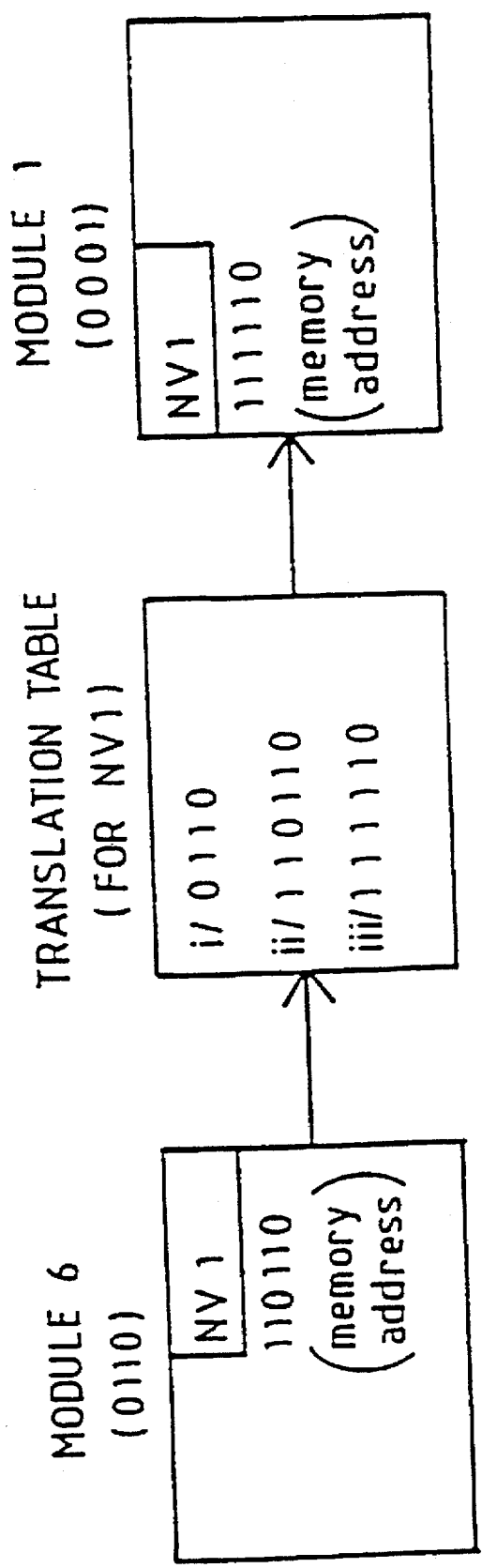
FIG. 8: Shows diagrammatically a method of updating network variables between modules.

This is shown diagrammatically in FIG. 8. Module 6 is assigned the module identification code 0110. Network variable 1 (NV1) is stored in the memory location 110110 of module 6. Within module 1 is a translation table which stores the module identification code of the module which supplies network variable 1 (NV1), the source memory address of the variable and the local memory address to which network variable 1 (NV1) should be stored. From this table module 1 can write the network variable 1 to memory address 111110 when this network variable is received on the serial bus.

Each module compiles a queue of network variables which have been requested by other modules. These are transmitted at the specified rate. For efficiency d number of network variables are transmitted in each packet. Each module stores a table of the foreign network variables that it requires. When a data packet is received the module compares the module identification code of the source module to its table of module identification codes. If the module identification code is not present the data packet is not scrutinised further. For example, a lighting control module need not receive network variables from a motor controller module. Accordingly, network variables transmitted by the motor controller module can be ignored.

If however the module identification code is present in the monitoring module's table of module identification codes then message parsing continues. The receiving module then determines whether the data packet contains information required by the module. Each network variable is read and compared with a table of required variables. If the network variables match then the network variable is written to the local memory location specified in the translation table of the module.

Each module therefore operates autonomously acting upon the network variables in its memory, which may be constantly updated. Semaphores representative of the states of other modules are used to determine whether a transition to another state is permissible (described in more detail hereinafter). Data variables are acted upon to modify the outputs of the module. For example, motor controller module, 2 may send a request over serial bus 10 to remote control module 12 requesting that the network variables for speed demand, direction demand and state of the control module be periodically transmitted to motor controller module 2. At the required update rate control module 12 will forward the requested network variables on serial bus 10. Motor controller 2 will update the network variables held in memory in accordance with the updates received from the control module 12 as described above. Motor controller 2 will thus control the outputs to the brake solenoids and motors in accordance with the variables measured internally and the network variables received from the control module 12.

Network variables may be added to a system without physically modifying existing modules. By reprogramming new network variables can be programmed into each module. This maximises the system flexibility and provides an effective way of communicating data in a modular system.

The updating process for network variables also provides a useful watchdog monitor. If a module does not receive a network variable from a module from which it has requested a network variable for a predetermined number of periods, say 5, this indicates that the source module has failed. This provides another useful check on system operation.

According to one embodiment of the invention each module may be assigned an 11 bit identification code. This may consist of a 4 bit group code, a 4 bit type code and a 3 bit unit code. Identifying modules in this way has the advantage that messages can be filtered on receipt, saving the processor of a module from interruption by irrelevant communications. Group codes may be assigned as indicated in table 7. Type codes may be assigned as indicated in table 8 and unit codes may be assigned as indicated in tables 9 and 10.

TABLE 7

Group code assignments

| Group codes | Classification |
|---|---|
| 0 | Mobility or traction control |
| 1 | Navigational aids |

TABLE 7-continued

Group code assignments

| Group codes | Classification |
|---|---|
| 2 | Actuators - e.g. seat raise, recline |
| 3 | External interfaces |
| 4 | Lighting controls |
| 5 | Environmental controls |
| 6–15 | Unassigned N.B. Group code 15 cannot be used with type codes 14 or 15. |

TABLE 8

Type code assignments for group 0:

| Type codes | Classification |
|---|---|
| 0 | Single channel traction motor controller module (PM) |
| 1 | Dual channel traction PM |
| 2 | Single channel PM with servo steering |
| 3–7 | Unassigned |
| 8 | User/attendant remote control |
| 9–12 | Unassigned |
| 13 | Programmer Configuration Diagnostic Unit |
| 14, 15 | Unassigned |

TABLE 9

Unit code assignments for group 0, type 0:

| Unit code | Classification |
|---|---|
| 0 | Left channel traction PM |
| 1 | Right channel traction PM |
| 2–3 | Reserved |

TABLE 10

Unit code assignments for group 0, type 8:

| Unit | Classification |
|---|---|
| 0 | User control (Proportional or switched joystick) |
| 1 | Attendant control |
| 2–3 | Reserved |

The control module will be included in every group to ensure that it can communicate with all modules, regardless of the filtering operation. This filtering can be implemented using the filtering provided in the microcomputer using acceptance filtering through use of the acceptance code register (ACR) and acceptance mask register (AMR), acting on the most significant 8 bits of the identification code (i.e. the group code and type code).

To facilitate communications between a given group of modules a session layer may be created in the network software. This enables a number of modules to dynamically form groups of modules which will communicate to the exclusion of other modules. The "insession" modules will accept external communications only to read their status (variables and status type). One or more master/slave relationships may be established depending upon the privilege levels assigned to each module. For example, a control module may be assigned master status when insession with a motor controller module. However, if a navigation module is included in the group it may be assigned mastership. Sessions may only be created and mastership allocated when a module is in a safe state. The forming of sessions enables the modules involved in a particular process to complete that process without interruption from external modules. Such sessions may be dynamically established and dissolved.

According to a preferred embodiment of the invention each module acts as a finite state machine. That is to say, each module has a given number of possible states and transition from one state to another is only possible if the module is in a given state and certain conditions are satisfied. In a complex modular system it is desirable for the operations of modules to be synchronised. To achieve synchronisation each module operates as a finite state machine. That is, the module has a number of unique states represented by a unique semaphore. Transitions are only possible between certain states upon certain prerequisite conditions being satisfied.

Figure 9:
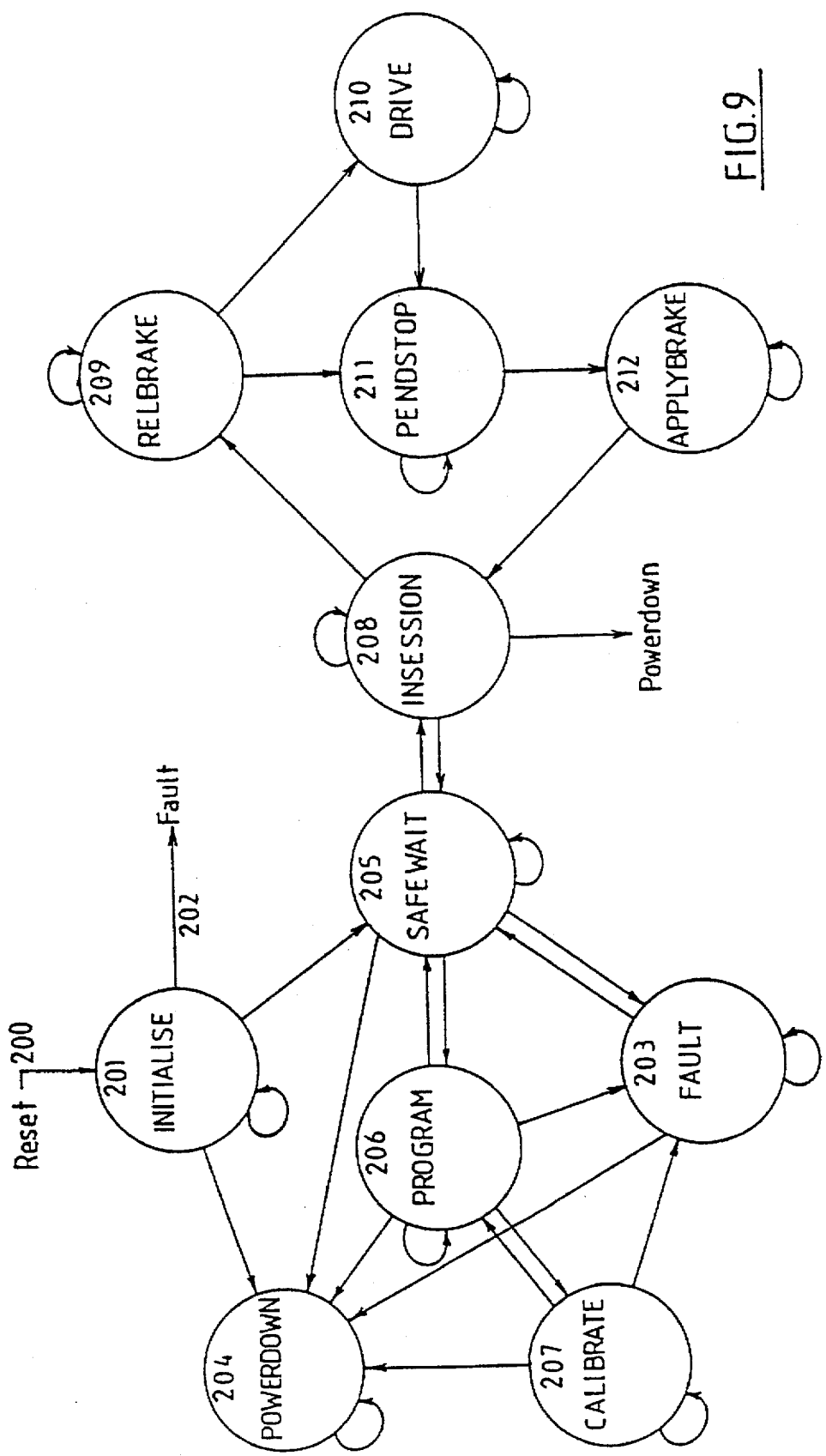
FIG. 9: Shows a possible state diagram for a motor controller module.
Figure 10:
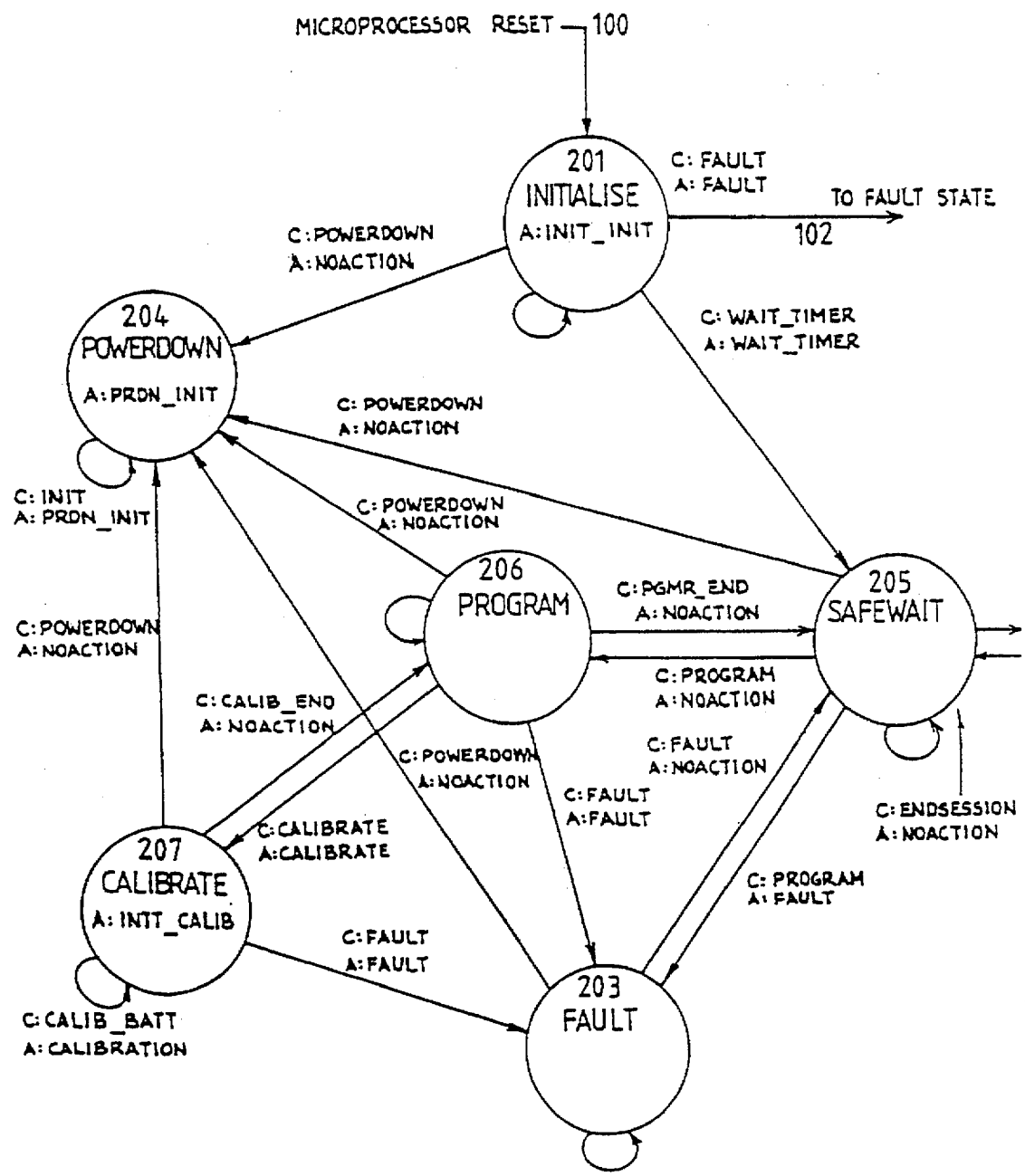
FIG. 10 and 11: Show the conditions required for transitions between the states of the state diagram of FIG. 9 and the system actions.
Figure 11:
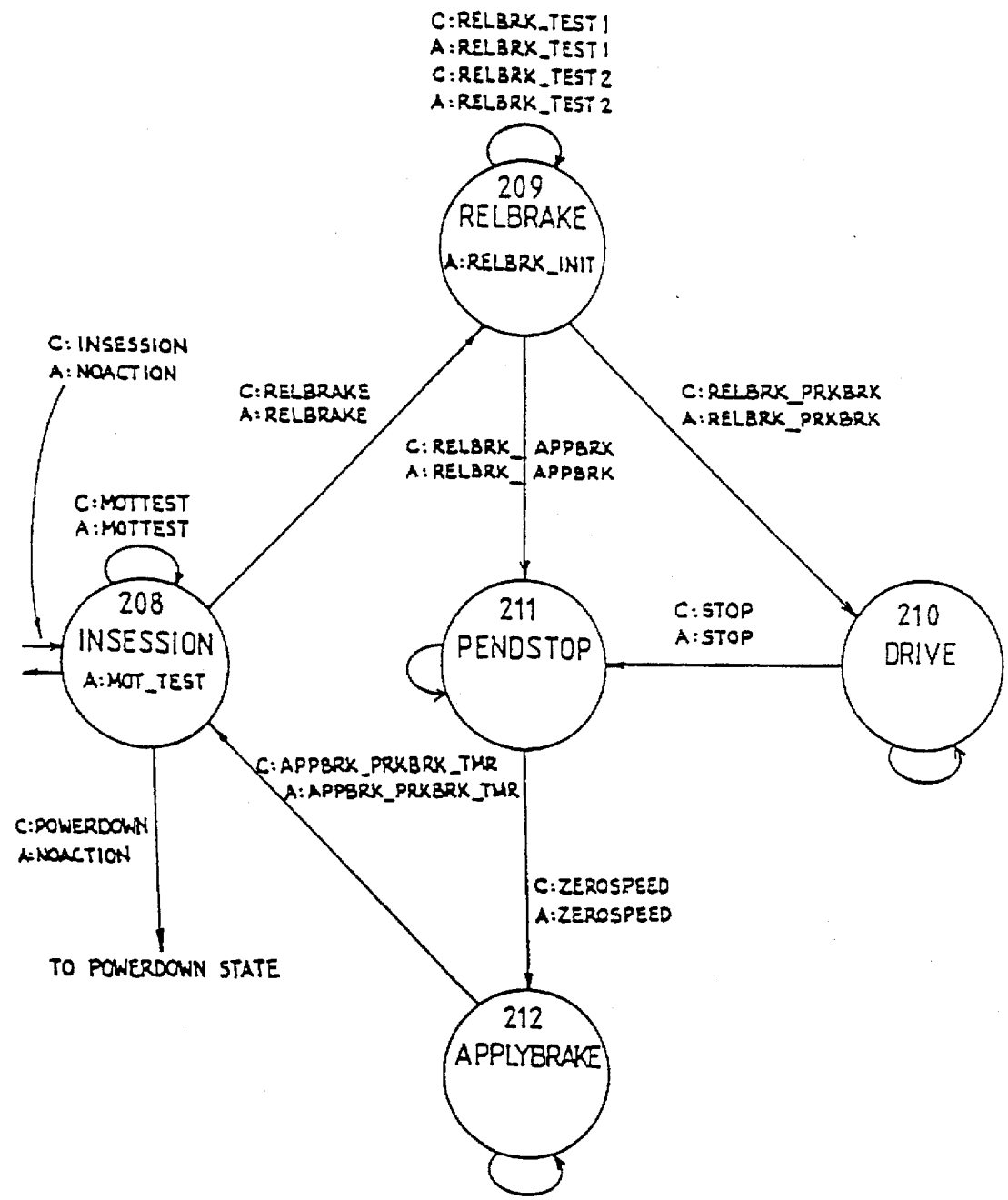
Figure 12:
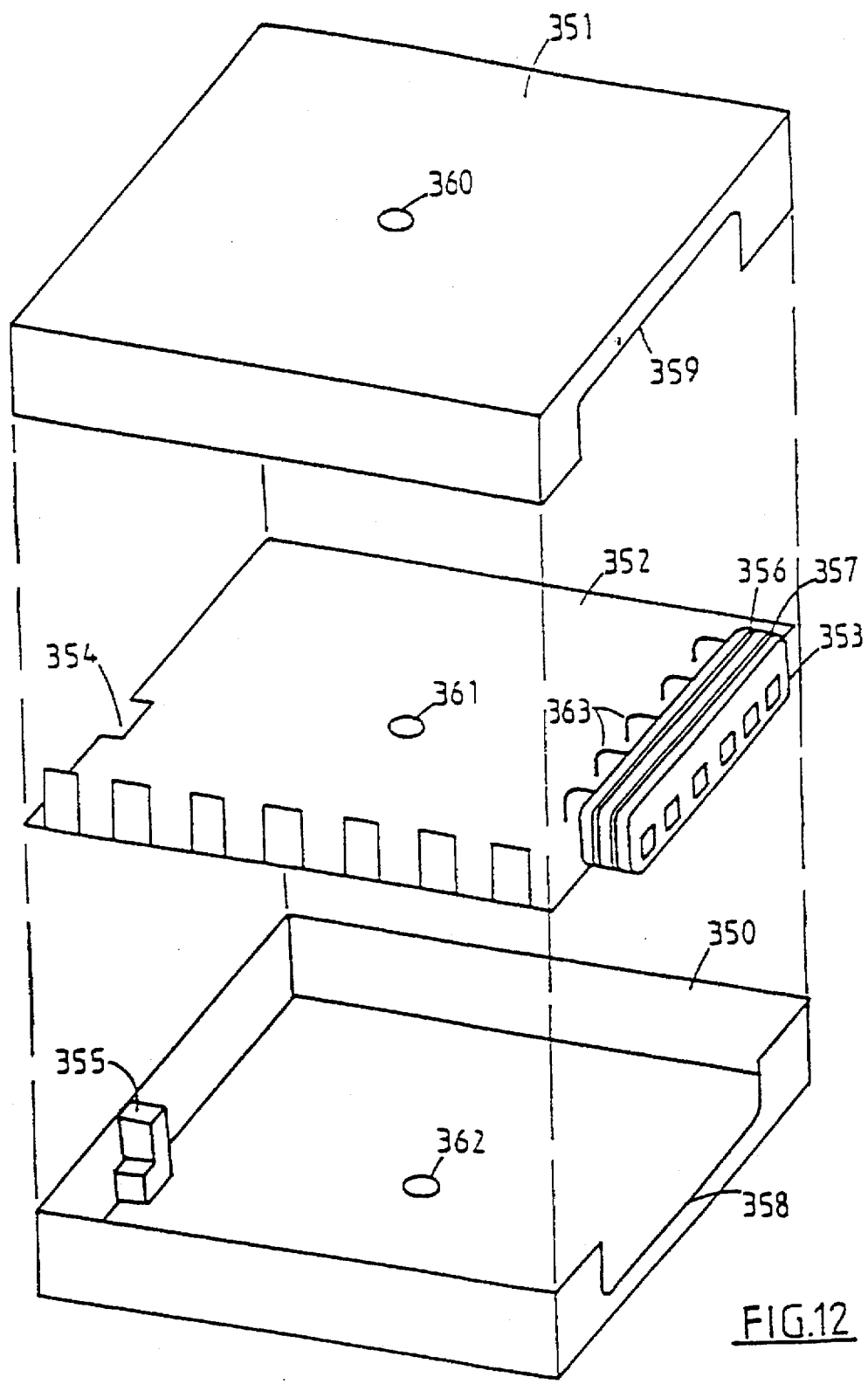
FIG. 12: Shows an arrangement for mounting the printed circuit board of a module within a casing.
Figure 13:
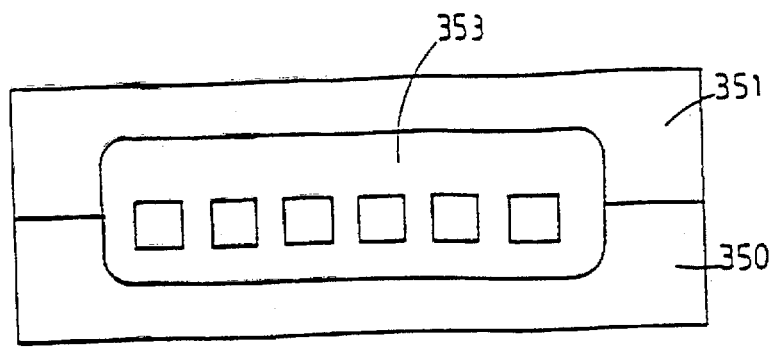
FIG. 13: Shows an end view of the casing when assembled.
Figure 14:
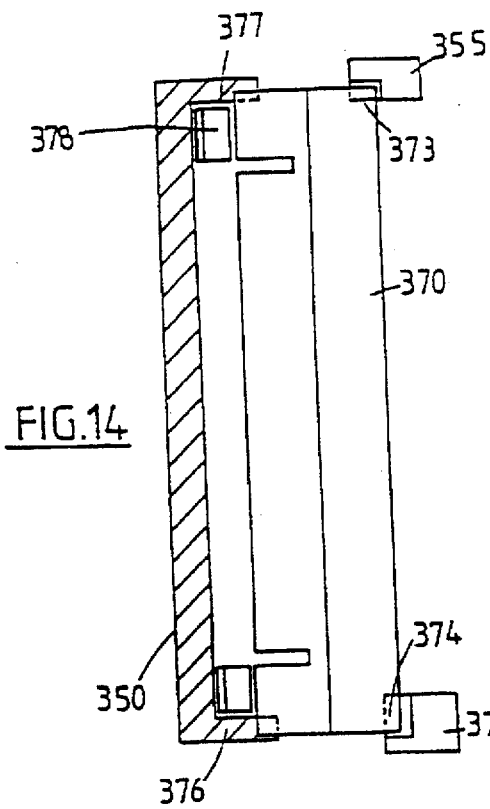
FIGS. 14 and 15: Show a preferred semiconductor mounting arrangement.
Figure 16:
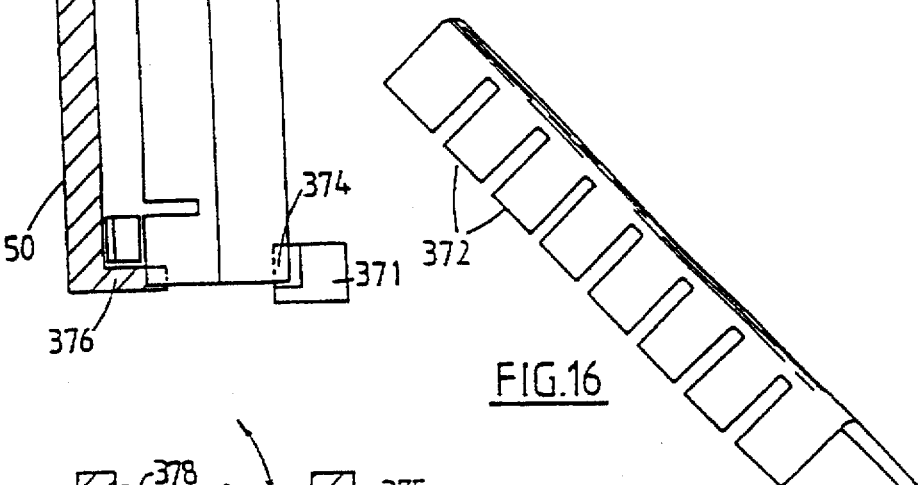
FIG. 16: Shows in perspective the biasing clip shown in FIGS. 14 and 15.
Figure 15:
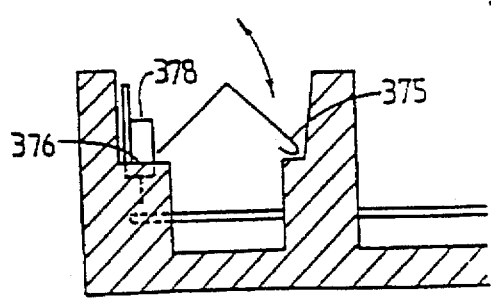

Each module stores in its memory the network variables representative of the state of other modules which affect the transitions of that module from one state to another. The condition(s) that must be satisfied for a module to move from one state to the next may be the state of another module or the state of an internally measured parameter or a combination of both. Referring to FIG. 9 a state diagram for a motor controller module is shown. FIGS. 10 and 11 show the left hand side and right hand side respectively of the diagram shown in FIG. 9 in more detail. The word following the letter "C" next to each arrow indicates the condition that must be satisfied for the module to transfer to the next state. The word adjacent the letter "A" indicates the action of the module when transferring to the next state. The word within each circle describes the state and the word below, adjacent the letter "A", indicates the action performed in that state. Upon the microprocessor being reset (200) the motor control module goes into the initialise state 201. In this state the module performs the required initialisation routines. If a fault condition is discovered during initialisation the fault condition of path 202 is satisfied and the module passes from the "initialised" state 201 via path 202 to the "fault" state 203. If the module receives a "power down" command from the command module the "powerdown" condition is met and the module passes to "powerdown" state 204. In this state the motor controller module performs the required power down sequences.

In normal operation initialisation will be completed in state 201 and the wait timer will elapse. In these circumstances the condition to pass to state 205 is satisfied. The motor controller module waits in "safewait" state 205 until a further condition is satisfied. If the Joystick of the control module is moved the control module will go into "insession" state. The semaphore for this state will be passed over the serial network and stored in the memory of the motor controller module as a network variable. When the motor controller module detects that the network variable for the controller module state has changed to the "insession" state the condition fox transition to state 208 will be satisfied. The motor controller module will thus pass to state 208 and the motor controller module state "insession" will be stored as a network variable in memory, passed to the control module and stored as a network variable in its memory. In response to the new motor controller modules state and the joystick command the control module will pass to a "release brake" state. Again, the network variable for the state of the control module will pass over the serial network to be stored in the motor controller module. Upon detection that the control module state has changed to the "release brake" state the condition for transition to state 209 is satisfied. Transition to the "release brake" state 209 by the motor controller module results in the action that the brake is released. The control module then detects the motor controller module has passed to the "release brake" state and passes to the "drive" state. Again, when the motor control module detects that the control module has changed state to the "drive" state it may pass to drive state 210. Only when in drive state 210 can the motors be driven in response to the speed and direction demands from the control module. Accordingly, for the motors to be driven the motor control unit must be in the "drive" state and receive speed and direction demands from the control module.

When the control module changes to its "stop" state the motor control module passes to a "pendstop" state 211. Before a brake can be applied the module must pass to the "apply brake" state 212. The condition to be satisfied for transition to the "apply brake" state 212 is that the motor speed must be zero. This is an internal variable measured by the motor control module. When the zero motor speed condition is satisfied, brakes may be applied. A predetermined time after the brakes are applied a park brake timer elapses. When the park brake timer elapses and the brakes are being applied the resulting action is that the park brakes are applied and the state of the motor controller module passes to the "insession" state 208.

State transitions of the modules are arranged so that the passing of modules between states is synchronised, and modules can only pass between certain states if the state of another module has changed to satisfy a required condition. An example of state changes between a control module (UCM) and dual motor control module (PM) in use is given in table 11.

TABLE 11

| Seq | User action | UCM state | PM state |
| --- | --- | --- | --- |
| 1a | Switch on | INITIALISE | INITIALISE |
| 1b | | SAFEWAIT | SAFEWAIT |
| 2A | JS forward (or rev, left, right) | SAFEWAIT | SAFEWAIT |
| 2b | | INSESSION | INSESSION |
| 2c | | RELBRAKE | RELBRAKE |
| 2d | | NEUTRAL | |
| 2e | | DRIVE | |
| 3a | JS returned to neutral for 2 seconds or more | DRIVE | DRIVE |
| 3b | | NEUTRAL | PENDSTOP |
| 3c | | APPLYBRAKE | APPLYBRAKE |
| 3d | | INSESSION | INSESSION |
| 3e | | SAFEWAIT | SAFEWAIT |
| 4a | Fault while driving | DRIVE | DRIVE |
| 4b | | NEUTRAL | PENDSTOP |
| 4c | | APPLYBRAKE | APPLYBRAKE |
| 4d | | INSESSION | INSESSION |
| 4e | | SAFEWAIT | SAFEWAIT |
| 4f | | FAULT | FAULT |

Both modules pass from the "initialise" to the "safewait" state once internal checks have been satisfied. Upon movement of the joystick the control module passes to the "insession" state. The network variable semaphore for the state of the control module is updated in the motor controller module. The new control module state satisfies the condition for the motor control module to pass to the "insession" state also. The control module detects that the motor control module has passed to the "insession" state, which allows it to pass to the "release brake" state. This change of state satisfies the condition for the motor control module to pass to the "release brake" state. The transition of the motor control module to the "release brake" state enables the control module to pass to the "neutral" state. This does not result in the change of state of the motor control module. The control module then passes to the "drive" state which satisfies the condition allowing the motor control module to pass to the "drive" state. It can be seen that the state transitions of the control module and motor control module are interdependent. Should either module fail to make a state transition this will prevent the other module from passing to a further state. This provides a further check between devices to ensure correct. Operation and synchronise operation. Furthermore it provides a further safeguard as the outputs of safety related modules are only enabled in a limited number of states.

Another important feature of the motor controller is a technique used to enhance the resolution of an eight bit pulse width modulator. Less expensive microcomputers usually only include eight bit pulse width modulators. The resolution of eight bit pulse width modulators is noticeably coarser than analogue control.

According to the method of the present invention the output of the pulse width modulator is smoothed by modulating the value applied to the pulse width modulator over a number of cycles.

Upon comparing the back EMF feedback signal with a desired motor velocity value the micro computer may generate an internal ten bit driving signal (8+2 bits (N+M)). The two least significant bits determine whether one bit is added to the 8 most significant bits for each pulse width modulator cycle. Table 1 shows for a ten bit input value whether or not 1 bit is added for each cycle. A "1" indicates one is added for a cycle and a "0" indicates nothing is added to the 8 bit value.

Each sampling period for a ten bit input value preferably consists of 4 ($2^M$) pulse width modulator cycles. At the end of each sampling period a new ten bit motor control value is inputted.

TABLE 1

| M bit values | Cycle 1 | Cycle 2 | Cycle 3 | Cycle 4 |
|---|---|---|---|---|
| 00 | 0 | 0 | 0 | 0 |
| 01 | 0 | 0 | 0 | 1 |
| 10 | 0 | 1 | 0 | 1 |
| 11 | 1 | 1 | 0 | 1 |

It will be appreciated that the method may be used for any number of bits desired. The method effectively gives 1024 output values (for 10 input bits) instead of 256 (for 8 input bits) for the same sampling period.

Where in the aforegoing reference has been made to integers or components having known equivalents then such equivalents are herein incorporated as if individually set forth.

Although this invention has been described by way of example and with reference to possible embodiments is to be understood that improvements or modifications may be made thereto without departing from the scope of the invention as defined in the appended claims.

INDUSTRIAL APPLICABILITY

The control means of the present invention may find application in the control of motors for wheelchairs, scooters and the like. The invention is particularly suitable for applications where an expandible modular control system is required.

We claim:

1. A control means for an electrically driven vehicle comprising:

two or more modules interconnected by a serial bus, said serial bus including one or more data lines, wherein one or more modules of said two or more modules includes means to shift a DC bias voltage on a data line of said serial bus, and one or more of said two or more modules includes means to alter the operating state of said two or more modules between an enabled and disabled condition while maintaining data communication between the two or more modules, wherein the means for altering the operational state of said modules corresponds to a kill means which monitors the DC bias voltage on said data line of said serial bus and disables functions of that module when the detected DC bias voltage is outside a set voltage range and wherein a user control switch is provided on a remote control module which can clamp the bias voltage on the serial bus below the lowest value of the set voltage range.

2. A control means as claimed claim 1 wherein the kill means of a motor controller module disables driving circuitry which drives one or more electrical motors by opening the contacts of an isolation relay which connects a battery supply to the driving circuitry.

3. A control means as claimed in claim 2 wherein the kill means of a motor controller module causes a park brakes of the vehicle to be applied.

4. A control means as claimed in claim 1 wherein the kill means of a motor controller module causes at least one park brake of the vehicle to be applied.

5. A control means as claimed in claim 1 wherein the kill means of a motor controller module disables driving circuitry which drives one or more electrical motor by disabling logic circuitry which supplies driving signals to the driving circuitry.

6. A control means as claimed in claim 1 wherein the serial bus has two data lines and the DC bias voltage is only applied to one of the data lines.

7. A control means as claimed in claim 1 wherein all modules include kill means which monitor the DC bias voltage and disable safety related functions of each applicable module when the DC bias voltage is outside the set voltage range.

8. A control means as claimed in claim 1 wherein all modules include means to shift the DC bias voltage on the serial bus outside the set voltage range upon detection of a fault.

9. A control means as claimed in claim 1 wherein the kill means comprises a window detector which disables functions of the module when the detected DC bias voltage is above or below a set range of allowed bias voltages.

10. A control means as claimed in claim 1 wherein functions of the one or more module are disabled a predetermined period after a shift in DC bias voltage is detected to enable the one or more module to assume a safe state before functions of the module are disabled.

11. A control means as claimed in claim 1 wherein at least one module includes wake-up means which monitors the bias level of said data line of the serial data bus when the module is deactivated and supplies power to the module upon detecting that the DC bias level is outside a set range.

12. A module for use in a modular control means for an electrically driven vehicle, the modules of said modular control means being interconnected by a serial bus, wherein the module includes kill means to disable functions of the module upon detecting that a DC bias level on a data line of the serial bus is outside a set range, wherein the module includes means to bias the data line of the serial bus outside the set range upon detection of a fault.

13. A module as claimed in claim 12 wherein the kill means includes a window detector which disables functions of the module when the DC bias voltage level is above or below a set range of DC bias voltages.

14. A module as claimed in claim 12 wherein the serial data bus has two data lines and the DC bias voltage is only applied to one of them.

15. A module as claimed in claim 12 wherein the module is a motor controller module and the kill means disables driving circuitry driving one or more electrical motor by opening the contacts of an isolation relay which connects a battery supply to the driving circuitry.

16. A module as claimed in claim 12 wherein the module is a motor controller module and the kill means, when invoked, causes at least one park brake of the vehicle to be applied.

17. A module as claimed in claim 12 wherein the module is a motor controller module and the kill means, when invoked, disables driving circuitry driving one or more electrical motor by disabling logic circuitry which supplies driving signals to the driving circuitry.

18. A module as claimed in claim 12 wherein functions of the module are disabled a predetermined period after a shift in DC bias voltage is detected to enable the module to assume a safe state before functions of the module are disabled.

19. A module for use in a modular control means for an electrically driven vehicle, the modules of said modular control means being interconnected by a serial bus, wherein the module includes kill means to disable functions of the module upon detecting that a DC bias level on a data line of the serial bus is outside a set range wherein the module is remote control module which is provided with a user controlled switch which can clamp the bias voltage on the data line of the serial bus below the lowest value of the set voltage range.

20. A module as claimed in claim 12 including wake-up means which monitors the bias level of said data line of the serial data bus when the module is deactivated and supplies power to the module upon detecting that the DC bias level is outside a set range.

* * * * *